(12) United States Patent
Steele et al.

(10) Patent No.: US 7,577,482 B1
(45) Date of Patent: Aug. 18, 2009

(54) SYSTEM COMPRISING INTERCHANGEABLE ELECTRONIC CONTROLLERS AND CORRESPONDING METHODS

(75) Inventors: Glen F. Steele, Webster, TX (US); George A. Salazar, Katy, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 410 days.

(21) Appl. No.: 11/683,770

(22) Filed: Mar. 8, 2007

(51) Int. Cl.
G05B 19/18 (2006.01)
G05B 15/02 (2006.01)
G05B 11/01 (2006.01)
G06F 15/16 (2006.01)
G06F 9/46 (2006.01)

(52) U.S. Cl. ............... 700/19; 700/2; 700/3; 700/6; 700/9; 700/20; 700/49; 709/208; 709/221; 718/104

(58) Field of Classification Search ........... 700/2–7, 700/9, 10, 11, 12, 19, 20, 40–43, 47, 49, 700/75, 82, 96, 116, 247–249; 709/208, 709/209, 220, 221, 226; 718/104, 105
See application file for complete search history.

(56) References Cited

U.S. PATENT DOCUMENTS

| | | | |
|---|---|---|---|
| 3,828,325 A | 8/1974 | Stafford et al. | |
| 5,548,510 A | 8/1996 | Ebert et al. | |
| 5,775,296 A * | 7/1998 | Goras et al. | 123/406.47 |
| 6,000,825 A * | 12/1999 | Fredriksson | 700/9 |
| 6,128,673 A | 10/2000 | Aronson et al. | |
| 6,601,124 B1 | 7/2003 | Blair | |
| 6,651,110 B1 | 11/2003 | Caspers et al. | |
| 6,718,408 B2 | 4/2004 | Esterberg et al. | |
| 6,718,409 B2 | 4/2004 | Houlberg | |
| 6,772,248 B1 | 8/2004 | McClure et al. | |
| 6,838,852 B1 | 1/2005 | Namuduri | |
| 6,973,658 B2 | 12/2005 | Nguyen | |
| 7,353,995 B2 * | 4/2008 | Strickland | 235/462.01 |
| 2003/0041191 A1 | 2/2003 | Pinate et al. | |
| 2004/0039459 A1 | 2/2004 | Daugherty et al. | |
| 2005/0021890 A1 | 1/2005 | Baker et al. | |
| 2006/0015299 A1 | 1/2006 | McDermott et al. | |

* cited by examiner

Primary Examiner—Sean P Shechtman
(74) Attorney, Agent, or Firm—Kurt G. Hammerle

(57) ABSTRACT

A system comprising an interchangeable electronic controller is provided with programming that allows the controller to adapt a behavior that is dependent upon the particular type of function performed by a system or subsystem component. The system reconfigures the controller when the controller is moved from one group of subsystem components to another. A plurality of application programs are provided by a server from which the application program for a particular electronic controller is selected. The selection is based on criteria such as a subsystem component group identifier that identifies the particular type of function associated with the system or subsystem group of components.

36 Claims, 3 Drawing Sheets

SYSTEM COMPRISING INTERCHANGEABLE ELECTRONIC CONTROLLERS AND CORRESPONDING METHODS

ORIGIN OF THE INVENTION

The invention described herein was made by employee(s) of the United States Government and may be manufactured and used by or for the Government of the United States of America for governmental purposes without the payment of any royalties thereon or therefore.

BACKGROUND OF THE INVENTION

1. Field of the Invention

The present invention relates generally to electronic controllers for use in systems/subsystems and, more specifically, to an interchangeable electronic controller architecture that allows different electronic controllers performing different functions to be interchanged within a network that recognizes and configures each electronic controller to perform its function.

2. Description of Prior Art

In general terms as used herein, electronic controllers are electronic circuits utilized to receive sensor data and manipulate the data and/or control the action or position of equipment such as actuators within a system based upon some predetermined requirements of the system. The electronic controllers are typically housed within boxes that may be interconnected within a system or subsystem via various connectors and/or wireless communication transceivers.

The following patents disclose art related to the subject matter of this application and are hereby incorporated by reference:

U.S. Pat. No. 3,828,325; U.S. Pat. No. 5,548,510; U.S. Pat. No. 5,828,905; U.S. Pat. No. 6,128,673; U.S. Pat. No. 6,601,124; U.S. Pat. No. 6,651,110; U.S. Pat. No. 6,718,408; U.S. Pat. No. 6,718,409; U.S. Pat. No. 6,772,248; U.S. Pat. No. 6,838,852; and U.S. Pat. No. 6,973,658.

SUMMARY OF THE INVENTION

Accordingly, the present invention provides a system that may comprise a plurality of groups of subsystem components such as a plurality of groups of sensors and actuators. Generally, the groups comprise different actuators but may share sensors or sensor information.

The system may comprise, in one embodiment, a sensor/actuator group identifier for each of the plurality of groups of subsystem components. Other elements may comprise a plurality of programmable, reconfigurable electronic controllers that are electronically interconnectable and interchangeable with each of the plurality of groups of subsystem components. The system may comprise at least one server in communication with the plurality of programmable, reconfigurable electronic controllers. The server is preferably operable for storing a plurality of software applications. Each of the plurality of software applications may be used to determine the specific operation of the plurality of programmable electronic controllers when they are electronically interconnected to its respective groups of subsystem components. The server may be programmed to select at least one of the plurality of software applications based on the sensor/actuator group identifier, and perhaps other information, and to transfer the plurality of software applications to the plurality of programmable electronic controllers for reconfiguration as needed.

The system may further comprise a plurality of sensor/actuator group identifier circuits that are electronically connectable with the plurality of programmable, reconfigurable electronic controllers for communicating the sensor/actuator group identifier associated with each of the plurality of groups of sensors and actuators to the plurality of programmable electronic controllers when the plurality of programmable electronic controllers are electronically interconnected to its respective plurality of groups of sensors and actuators. In one embodiment, the plurality of sensor/actuator group identifier circuits may comprise at least one of a switch box, a connector, a cable, and a Radio Frequency Identification Device (RFID).

In one embodiment, not only are the controllers interchangeable, but also the server may be interchangeable with one or more of the plurality of programmable, reconfigurable electronic controllers.

In one embodiment, the system may further comprise architecture information specific to each of the plurality of programmable, reconfigurable electronic controllers. This information may be stored in a memory within each of the plurality of programmable electronic controllers. In this embodiment, the server may then be programmed to select software applications based on the sensor/actuator group identifier and the architecture information. Thus, the plurality of controllers need not be identical or work on identical software platforms.

The plurality of programmable, reconfigurable electronic controllers may comprise at least one analog signal circuit, which may be utilized to receive sensor data and/or for controlling actuators. The analog signal circuit may comprise a programmable gain for suitable operation of a feedback loop, amplification of sensor signals, power control signals, or the like.

The plurality of programmable electronic controllers may comprise at least one digital input/output circuit. In one embodiment, a plurality of sensor/actuator group identifier circuits is electronically interconnectable with the plurality of programmable, reconfigurable electronic controllers through its respective one of the digital input/output circuits.

The plurality of programmable, reconfigurable electronic controllers may comprise non-volatile memory operable for storing a software application received from the server.

The system may utilize wired connections, but the plurality of programmable electronic controllers might also comprise wireless communication means.

In operation, one possible method for operating the system may comprise steps such as, for instance, selectively electronically interconnecting at least one of a plurality of programmable electronic controllers to each of the plurality of groups of sensors and actuators, and electronically interconnecting the server with the plurality of programmable, reconfigurable electronic controllers.

Other steps might comprise providing a plurality of software applications that determine operation of the plurality of programmable, reconfigurable electronic controllers when the plurality of programmable, reconfigurable electronic controllers are electronically interconnected to each respective group of subsystem components.

The method may comprise storing the plurality of software applications in the server and/or on one or more of the programmable electronic controllers and providing at least one sensor/actuator group identifier for each of the plurality of groups of subsystem components.

The method may utilize a designated or dedicated server wherein steps may comprise programming the server to select at least one of the plurality of software applications based on the sensor/actuator group identifier and to transfer the plurality of software applications to each of the plurality of electronic controllers.

The method may comprise providing a sensor/actuator group identifier circuit to store the sensor/actuator group identifier for each of the plurality of groups of sensors and actuators, wherein the circuit may be hardwired and/or store the identifier in a memory. Additional steps may comprise communicating the sensor/actuator group identifier for each of the plurality of groups of sensors and actuators to its respective plurality of programmable, reconfigurable electronic controllers. In one embodiment, after the step of communicating the sensor/actuator group identifier to a respective one of the plurality of programmable electronic controllers, then another step may comprise transferring the sensor/actuator group identifier to the server.

The method may further comprise storing architecture information specific to each of the plurality of programmable electronic controllers in the plurality of programmable electronic controllers. Other steps may comprise programming the server to select the plurality of software applications based on the sensor/actuator group identifier and the architecture information. The method may further comprise communicating the architecture information from its respective plurality of programmable electronic controllers to the server.

The method may comprise programming each of the programmable electronic controllers with boot up programming that is utilized to establish communication with the server.

In another embodiment, a method for making a system may comprise steps such as, for instance, providing a sensor/actuator group identifier for each of the plurality of groups of sensors and actuators, providing a plurality of programmable, reconfigurable electronic controllers, and providing that a server, or one or more of the electronic servers that is designated or utilized as a server, is operable for storing a plurality of software applications.

Other steps may comprise programming the server to select at least one of the plurality of software applications based on the sensor/actuator group identifier and to transfer the plurality of software applications to the plurality of electronic controllers.

The method may further comprise providing that each of the plurality of programmable, reconfigurable electronic controllers is interchangeable to operate with each of the plurality of groups of sensors and actuators.

In yet another embodiment, a method for repairing a system may comprise replacing the electronic controller whenever a respective one of the plurality of programmable electronic controllers fails. In this embodiment, the server transfers a respective software application to the replacement electronic controller.

DETAILED DESCRIPTION OF THE INVENTION

Figure 1:
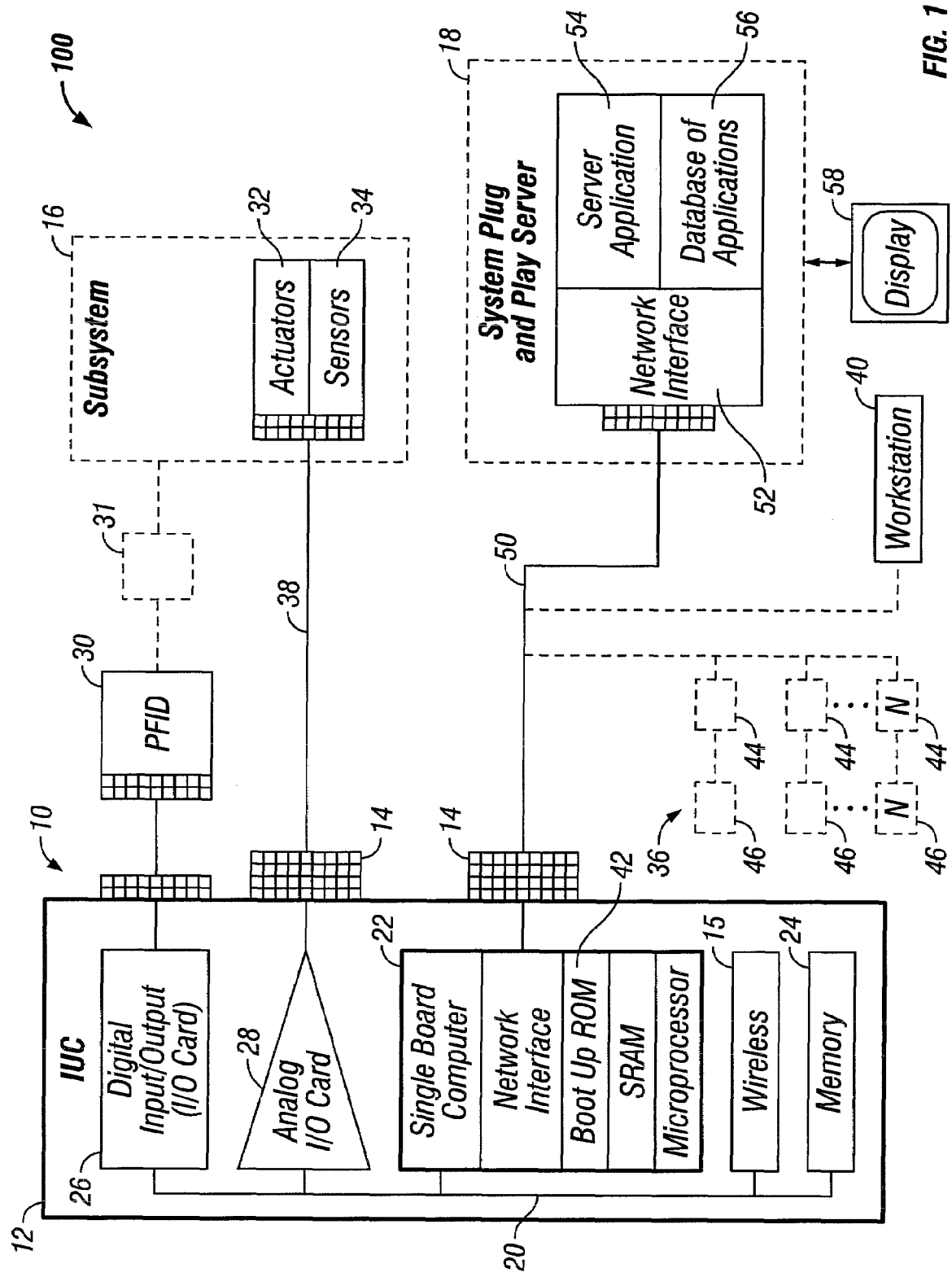
FIG. 1 is a schematic diagram that illustrates interconnection of a single interchangeable, reconfigurable electronic controller with a system and a system network in accordance with an embodiment of the present invention.

Referring now to the drawings or more particularly to FIG. 1, one exemplary embodiment of the invention is shown, although variations of this particular embodiment are possible. In this example, an interchangeable unit electronic controller (IUC) 10 includes a housing or box 12 and may comprise one or more physical connectors 14, which may be standardized connectors that permit controller 10 to be readily physically interconnected to system and/or subsystem components 16 and system network server 18. System and subsystem components 16 may comprise a group of subsystem components wherein the particular type of function performed by at least one of said group of subsystem components differs in nature from the particular type of function performed by another one of said group of subsystem components. For instance, one subsystem may perform environmental life support, whereas another subsystem may perform rocket engine propulsion. The sensors may be the same and/or electronic controllers 10 may be electronically connected either directly or indirectly to commonly utilized sensors and/or directly receive sensor data or indirectly receive and/or provide sensor data over a network or other communication means. Actuators may be of various types, such as mechanical, pneumatic, hydraulic, fluidic, or electrical devices that perform a response to an input signal, which may be mechanical, pneumatic, hydraulic, electrical, fluidic, or the like. In other words, any of various mechanical, fluidic, electrical, hydraulic, or pneumatic mechanisms may be utilized by means of which an apparatus or device is moved or controlled indirectly in a manner other than manually. System and subsystem components 16 may also comprise, either additionally or in the alternative, various sensors, transducers, or the like. Such devices may be designed to sense or detect a physical stimulus (e.g. temperature, light, motion). Sensors might then transmit a resulting signal for interpretation or measurement or for operating a controller. Sensor information may be shared by interchangeable electronic controllers 10 for operation of subsystem components. Generally, the controller 10 operates with a system which may comprise an assembly formed of often diverse parts, e.g. subsystems, which are subject to a common plan or serving a common purpose. The system may be an aggregation or assemblage of components joined in regular interaction or interdependence such as a set of components and/or subsystems combined to form an integral, organic, or organized whole.

Controller 10 may further comprise at least one wireless transceiver 15 that may be utilized with or instead of physical connectors 14. Wireless connections may also be utilized to drive actuators that incorporate a power output drive, but need a signal input. Accordingly, any type of wireless connection may be utilized for any purpose such as radiowave, infrared, optical signal, and the like. Specific data connections may be made through standardized power lines and the like which can be used as carriers for the specific data. Accordingly, the step of providing physical interchangeability of one or more of controller 10 into the system can be implemented in numerous alternative ways.

Interchangeable electronic controller 10 is programmable and reconfigurable and may comprise commercial-off-the-shelf (COTS) PC-104 based cards coupled with various custom-based cards. In this embodiment, internal data bus 20 provides for internal communication within interchangeable electronic controller 10 among the various circuits boards thereof, and computer 22 may be of any desired type, e.g., a COTS single board computer. Computer 22 comprises various elements such as, for example, a static random access memory, an Ethernet network interface, a PowerPC microprocessor, and a boot-up read-only memory (ROM) 42 (e.g., reprogrammable non-volatile memory). Computer 22 communicates with all the circuit cards within interchangeable electronic controller 10 and non-volatile memory 24, such as a hard drive or the like, over internal data bus 20. Additional electronic circuits such as circuit boards within interchangeable electronic controller 10 may comprise a digital input/output (I/O) component 26 and analog input/output (I/O) component 28. The specific types of circuitry used within interchangeable electronic controller 10 may be of various types. Each interchangeable electronic controller 10 need not be identical in architecture with one another.

In this embodiment, analog input/output card 26 comprises programmable amplifier gain capabilities to thereby provide the capability of varying the feedback loop gain as necessary, and/or for other purposes. Additional digital or analog input and/or output cards might also be utilized for acquiring and/or sending signals. In this example, analog input/output 26 can acquire sensor data as well as send analog or power control signals.

Figure 3:
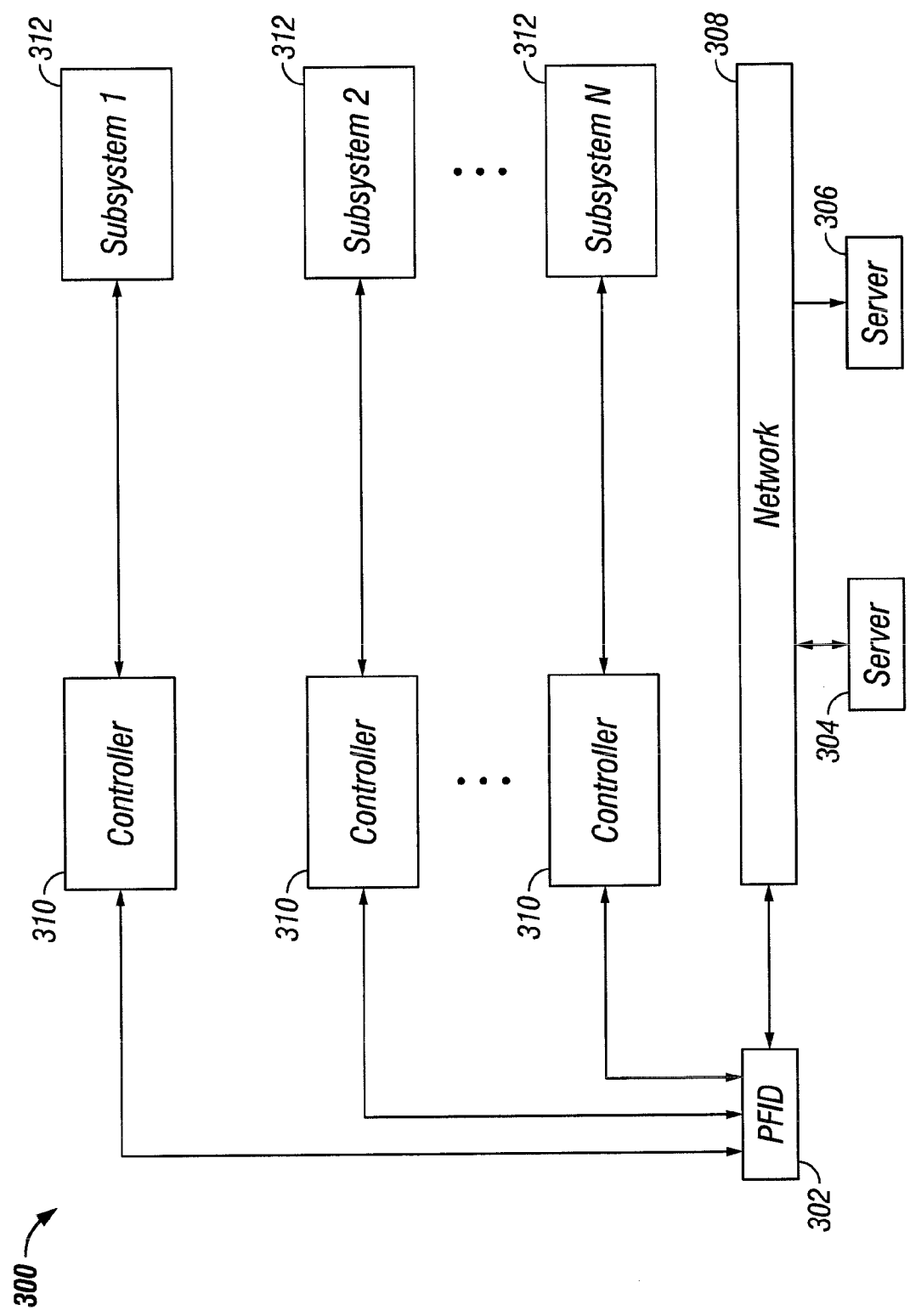
FIG. 3 is a block diagram showing multiple interchangeable, reconfigurable electronic controllers for use with different subsystems in accordance with another embodiment of the present invention.

The present invention utilizes various means to designate the positional and functional identification (PFID) of interchangeable electronic controller 10 within a system, such as system 100 of FIG. 1 or system 300 of FIG. 3. For example, once the position of interchangeable electronic controller 10 is identified within system 100, then the function is respectively designated, and interchangeable electronic controller 10 is configured using software code that is retrievable from system network server 18. Thus, system network server 18 may store the various applications to be utilized in each interchangeable electronic controller 10 within a database of applications 56.

The PFID might effectively specify a function, but may also identify positional information when similar functions are used in similar types of subsystems, e.g., controlling different air surfaces such as flaps or elevators, whereby the system can identify which surface is being controlled. Accordingly, the PFID component is an identifier such as a digital sensor/actuator group identifier that permits system network server 18 to select the correct software code for programming single board computer 22 or the like within interchangeable electronic controller 10. Interchangeable electronic controller 10 is able to read the positional and/or functional identification (PFID) attributes to determine the required system operation once installed into a system/subsystem, such as system 100 shown in FIG. 1.

As discussed below, other information such as the types of components or platform used in interchangeable electronic controller 10 may also be supplied to system network server 18. In this manner, the software code will be specific to the particular electronic architecture or software/hardware upgrade levels and/or platform of a particular interchangeable electronic controller 10. As noted above, each interchangeable electronic controller 10 need not be identical, because the software code can be utilized to provide the correct function if the architecture among different interchangeable electronic controllers 10 varies. System network server 18 may be embodied with alternative processor/operating systems other than the architecture represented in FIG. 1.

In one embodiment, the PFID component 30 may be configured with pull up/down resistors to represent a system-unique PFID signature used to identify the position and function of component 16 to interchangeable electronic controller 10. PFID component 30 may be directly connected to system components such as system or subsystem component 16. In another embodiment, PFID component 30 may be operatively connected to cable interconnection box 31, whereby pull up/down resistors may be positioned within the interconnection box 31 itself. For this embodiment, interconnection box 31 could be connected by otherwise standard cables to PFID component 30 to provide the correct PFID to each interchangeable electronic controller 10.

Alternative implementation techniques may also be utilized to achieve the function of the PFID component 30 other than the use of a pull-up/down resistor network. For example, the function of PFID may include technologies that can be used to create unique digital signatures such as a serial or parallel electrically erasable read only memory, or at least one radio frequency ID (RFID) tag. For example, at least one RFID tag would be secured to a physical mounting component 30 for each interchangeable electronic controller 10. Accordingly, a skilled artisan will appreciate that various equivalent implementation means may be used to provide the function of positional and/or functional identification for PFID component 30.

The PFID component 30 is part of the system/subsystem 16 to which interchangeable electronic controller 10 is joining. Thus, the PFID component 30 is not typically a component of interchangeable electronic controller 10. However, the possibility of a keypad, memory stick, or other input means might also be utilized to provide the PFID to interchangeable electronic controller 10. Due to the use of the PFID, the system might be said to exhibit "plug and play" characteristics. The step of positional and/or functional identification permits reconfiguration of interchangeable electronic controller 10 to provide the desired control to the system/subsystem. In one possible embodiment, the step of PFID is incorporated into the act of connecting the system/subsystem to interchangeable electronic controller 10. Thus, it is not required that a separate step of attaching the PFID component 30 to interchangeable electronic controller 10 be performed, as suggested in FIG. 2. Instead, the step of PFID may be incorporated into the act of connecting the system/subsystem to interchangeable electronic controller 10.

As indicated in FIG. 1, system and/or subsystem components 16 may comprise actuators 32 such as a solenoid or relay array, or the like, which may control valves or other devices, and the like. A skilled artisan will understand that controllers are used to operate different types of system and/or subsystem components 16. System and/or subsystem components 16 may also comprise various sensors or transducers 34 or other types of inputs required by interchangeable electronic controller 10. Within network 36, system 100 may further comprise any number of interchangeable electronic controllers 10, system or subsystem components 16 as indicated by controllers 44 and actuators and/or sensors 46, respectively.

System network server 18 and interchangeable electronic controller 10 might also be interchangeable. For instance, instead of obtaining the code from system network server 18, the code might be downloaded from another interchangeable electronic controller 10 that is already within the system. Alternatively, system network server 18 may simply be another interchangeable electronic controller 10 that is programmed to operate as system network server 18. Workstation 40 may also be interchangeable with or supply the function of system network server 18.

When not connected to a subsystem and network, interchangeable electronic controller 10 may be designed to hold the most recent software application load in non-volatile memory as well as the most recent PFID read. If interchangeable electronic controller 10 is attached to the same location and powered up with the same PFID, then interchangeable electronic controller 10 jumps to the application code that has been previously stored in non-volatile memory 24. Otherwise, once connected to the network/subsystem and powered up as discussed below, the undifferentiated interchangeable electronic controller 10 reads the supplied positional and functional identification, such as for example using PFID component 30.

As a subsequent step, interchangeable electronic controller 10 may transmit information identifying its own corresponding host platform type that sets the architecture of electronic controller 10 (e.g., a particular model of PowerPC board, an IBM pc model, or any other platform/operating system combination) and the information corresponding to PFID to system network server 18 over the network 36. Based on the host type information and the PFID information, system network server 18 transfers the appropriate application-specific software to interchangeable electronic controller 10. This application-specific software will cause interchangeable electronic controller 10 to reconfigure and fulfill the function signified by the PFID.

While not necessarily require, transmission of information related to both the PFID and the host type may be desirable. In different systems, the platform and/or electronic architecture used to implement interchangeable electronic controller 10 could vary. Transferring the host type information that sets forth the architecture of electronic controller 10 is useful to keep the entire system operating with legacy as well as with newly developed systems (such as in a non-heterogeneous system) and is intended to prevent the attempted loading of incompatible application code into interchangeable electronic controller 10. The application-specific software loaded into interchangeable electronic controller 10 comprises the code necessary for operation with the system and/or subsystem components 16. This software may also allow display of the subsystem status on any network-workstation display device (if any), such as workstation 40. After completion of the software-load, interchangeable electronic controller 10 is configured to perform the function in the system 16 to which it is operatively connected.

In an example of operation, two different positional and functional identifications (PFID's) were used to show the adaptable behavior of interchangeable electronic controller 10 as dictated by the PFID and the system network server 18 when exchanged among two different subsystems. The demonstration used a solenoid array interface connected by subsystem transmission medium 38 wherein system and/or subsystem components 16 are emulated, first as a rocket motor engine controller and then as an environmental control life support system (ECLSS) controller. Subsystem transmission medium 38 may comprise cables, wireless channels, optics, or the like. Switching between the two configurations was demonstrated by attaching two different PFID components to the interchangeable electronic controller 10, causing the interchangeable electronic controller 10 to reconfigure and adapt its behavior to the role identified by the PFID component. Serving as an engine controller, the interchangeable electronic controller 10 controlled solenoid valves and sensors monitoring pressure and temperature of engines as necessary for the control of a rocket motor. When serving as an ECLSS controller, the interchangeable electronic controller 10 controlled an ECLSS interface with a solenoid valve interface to control atmospheric pressure in a pressure vessel or cabin. In the case of the ECLSS for the purpose of demonstration, the cabin pressure sensor was simulated. The point of the demonstration was to emphasize the ability of the interchangeable electronic controller 10 to reconfigure itself to meet a different role required by the system to which it was operatively connected.

For this demonstration, the first PFID component contained information that would identify to the system network server 18 that interchangeable electronic controller 10 is operatively connected to a propulsion subsystem and to configure the interchangeable electronic controller 10 to operate as an engine controller. The second PFID component contained information to identify to system network server 18 that interchangeable electronic controller 10 is operatively connected to an ECLSS subsystem and to reconfigure interchangeable electronic controller 10 as an ECLSS controller. In addition to configuring interchangeable electronic controller 10 to perform a specific control function, display and command code uploads allow the interchangeable electronic controller 10 to receive commands from any workstation, such as workstation 40, as well as send its emulated system and/or subsystem components 16 information in a displayable format to the computer acting as the server and network workstation. Though the description herein is of a controller function, an interchangeable electronic controller 10 could also operate as a data acquisition unit in a subsystem only functioning to acquire raw sensor data.

In another embodiment, controller 10 may also provide the function of a computational resource. In such an embodiment, system 100 would transmit data from a requesting interchangeable controller 10 (functioning as a controller) to a second interchangeable controller 10 additionally configured to perform calculations. The second controller would perform a calculation such as, for example, a fast Fourier transform or an infinite impulse response filtering application involving digital signal processing, and then transmit such calculated results back to the requesting interchangeable controller.

Figure 2:
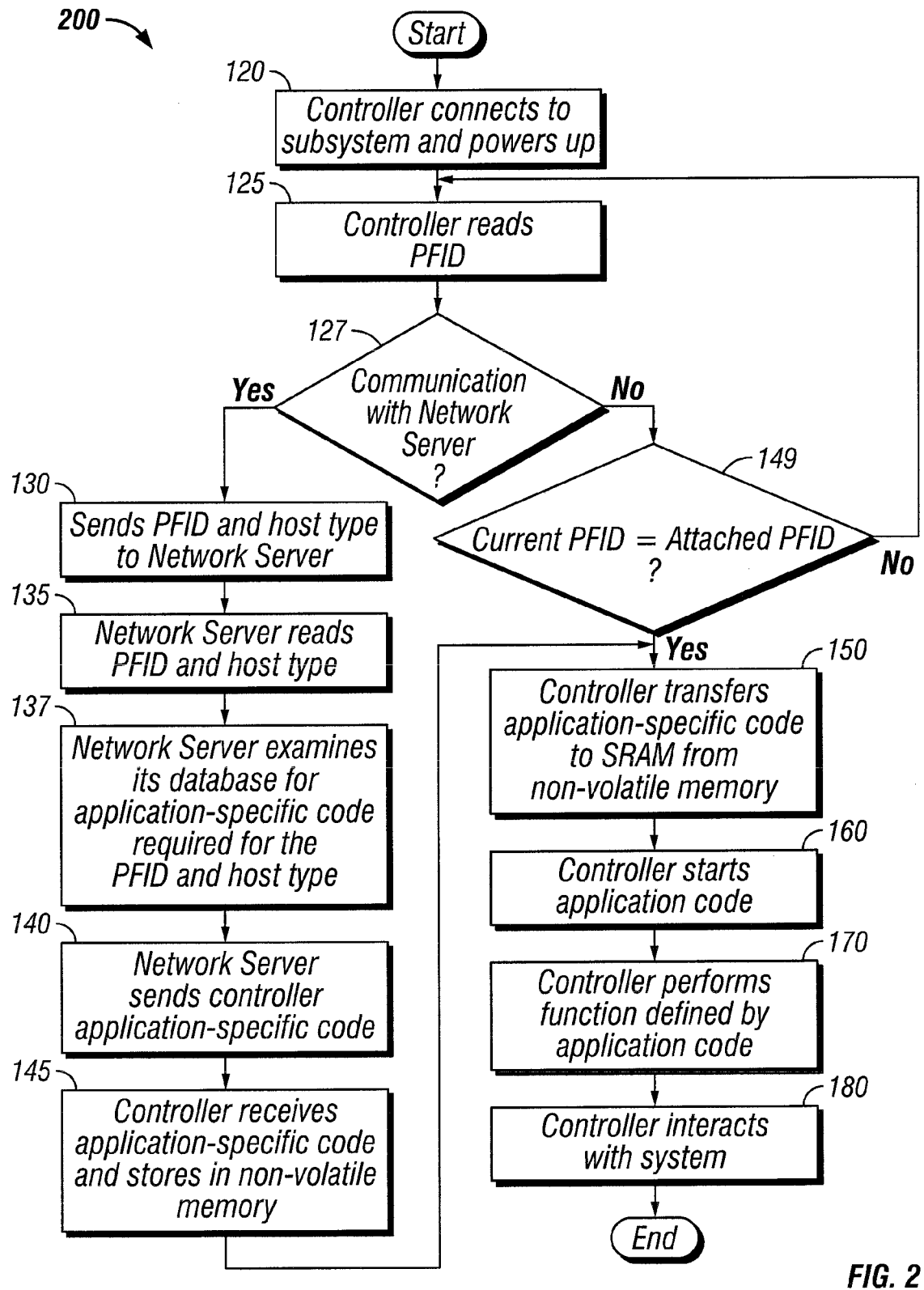
FIG. 2 is a flow chart representing a process of operation for an interchangeable, reconfigurable electronic controller that interacts with a network server within a system in accordance with an embodiment of the present invention.

Referring now to FIG. 2, flow chart 200 represents the process of operation of one embodiment in accordance with the present invention. As shown by step 120, the operation begins with the act of operatively connecting an interchangeable, reconfigurable electronic controller 10 to a component of a predetermined subsystem. Upon the act of powering up the computer of the interchangeable electronic controller 10 (which might be single board computer 22), boot up ROM 42 (shown in FIG. 1) performs a power-on self test (POST) and configures the devices located on internal local bus 20 in accordance with the bootable files located in the boot up ROM 42. After POST and initialization of the hardware components that form the architecture of interchangeable electronic controller 10, controller 10 loads the software of network system 100 from nonvolatile memory 24, as may be provided by a hard drive or other memory device. The software of network system 100 dictates the sequence of steps that interchangeable electronic controller 10 performs during start-up. Once the software of network system 100 begins controlling the behavior of the interchangeable electronic controller 10, controller 10 begins a sequence of steps that will cause it to perform as a specific controller, such as for example, a rocket engine controller or an ECLSS controller.

Next, as step 125 shows, computer 22 commands the digital I/O card 26 to read the signature of the PFID component 30 operatively linked (for example, connected by wire or linked wirelessly) to the interchangeable electronic controller 10. As previously indicated, the unique signature of a PFID component identifies the positional and/or functional requirements necessary for the interchangeable electronic controller 10 to fulfill its control functions as a part of the system to which it joined. At step 125, the interchangeable electronic controller 10 does not yet have its set of instructions to implement the desired control function based on the positional and functional requirements of the system and/or subsystem 16 to which it joined. The single board computer 22 compares the current PFID stored in the nonvolatile memory 24 with the new PFID being transmitted to the controller. In one example, the data providing PFID may comprise 16 or fewer discrete bits. The number of bits must be sufficient to provide the required unique identification of functional, positional, or functional and positional requirements from among the number of system or subsystem components that may be utilized within interchangeable controllers.

If communication with system network server 18 cannot be established at decision point 127 of the process, and the current PFID matches the attached PFID, as indicated at decision point 149, the interchangeable electronic controller 10 proceeds to step 150. During the previously mentioned demonstration, two different PFID's were used to selectively adopt the behavior of an engine controller or an ECLSS controller. With this demonstration, the interchangeable electronic controller 10 only utilized four discrete bits for the data providing PFID. The mathematical magnitude of the data providing PFID in another implementation would need to be of sufficient size to accommodate all potential interactions of an interchangeable electronic controller 10 in a system.

If communication with system network server 18 can be established at decision point 127, the process proceeds to step 130. At step 130, interchangeable electronic controller 10 transmits the information related to PFID and its own host type to the listening network server 18 over the network transmission medium 50, which may be a cable, a wireless path, or the like. While a hard-line 100 base-T Ethernet was used in the demonstration, other network protocols and transmission mediums can be used, such as fire wire or mil-std-1553b for protocols and fiber optics or even wireless for the transmission medium. Step 135 shows system network server 18 listening on the network to read the information on PFID and host type sent by interchangeable electronic controller 10. Server network interface 52, located in system network server 18, receives the network message containing the information on PFID and the host type of controller 10 and writes them into server memory. The server then messages interchangeable electronic controller 10 via the network as to which files to expect. The entire protocol described in this step of the process is preferably monitored by watchdog timers in both interchangeable electronic controller 10 and system network server 18. The timers will cause this step of the process to periodically repeat at a predefined rate should an interruption or error in the exchanges of data occur between the interchangeable electronic controller 10 and systems network server 18.

When the process reaches step 137, the system network server 18 utilizes a database to select a pre-determined set of application code and associated files for transmission to the interchangeable electronic controller 10 that is appropriate for the combined PFID and host type information received. At step 140, the network server 18 sends the application specific code and any supporting files to the interchangeable electronic controller 10 using the network transmission medium 50. The protocol used for this transmission ensures the integrity of the application specific code and supporting files received by computer 22 from server network interface 52.

At step 145, interchangeable electronic controller 10 receives application-specific code and supporting files over network transmission medium 50 from system network server 18 and stores them in non-volatile memory 24. The protocol used to exchange the application specific code and supporting files from the system network server 18 to interchangeable electronic controller 10 ensures the integrity of the data received by the interchangeable electronic controller 10. Storage of the application-specific code and supporting files in nonvolatile memory 24 embodied by a hard drive or the like ensures these resources are not lost, should interchangeable electronic controller 10 have a loss of power, or should an interruption occur in the connection between interchangeable electronic controller 10 and the system network server 18. The specific operation of the interchangeable controller is determined by program instructions specific to operation at that particular position in the system. These instructions are received from one or more servers connected to the system.

At step 150, interchangeable electronic controller 10 transfers the application-specific code to the static random access memory (SRAM). Computer 22 initiates the transfer of the application specific code from nonvolatile memory 24 to the high speed SRAM. Step 160 indicates that interchangeable electronic controller 10 executes the application-specific code from the SRAM. Once the application specific code is executing in computer 22, commands are sent to digital input/output 26 and analog input/output 28 to perform the functions that are required by system and/or subsystem component 16. In one possible embodiment, digital I/O 26 can send discrete commands, and be utilized to read the information related to PFID.

Similarly, analog input/output 28 may be used to send signals to drive valves, monitor valve currents, monitor temperatures and monitor pressures utilizing subsystem transmission medium 38. For the ECLSS demonstration discussed hereinbefore, the application-specific code monitored cabin pressures. For the engine controller, the application specific code resulted in interchangeable electronic controller 10 monitoring valve currents, temperatures, and pressures. With both application codes, the solenoid current was monitored.

At step 170, the interchangeable electronic controller 10, differentiated and configured by the application code associated with the PFID, provides data, status and control to other entities that require those services as a part of a system. For the demonstration previously described, solenoid current data was acquired by computer 22 from the analog I/O 28 and then digitized. This telemetry was supplied to other applications running on separate processors (entities) that were attached to network transmission medium 50. Such communication of data status and control could be made available by a variety of means. Thus, industry accepted standards suitable for the exact circumstances can be applied as understood by the skilled artisan. For example, a modern publish and subscribe solution or other middleware solutions might be applied to the interchangeable electronic controller 10 by the application and its interaction with other entities responsible for control and display on the system/subsystem network.

With the demonstration, the interchangeable electronic controller 10 stored telemetry in the SRAM of computer 22 temporarily until it was periodically broadcast via the network interface over network transmission medium 50 to control and display applications running on separate processor entities that were a part of the system/subsystem.

Step 180 is the point in the process where interchangeable electronic controller 10, differentiated by the code associated with the attached PFID, interacts with other application elements or processor entities that are a part of an entire system, such as system 100. The other entities may execute on the same processor platform as the server application 54 used by system network server 18. However, the applications that interact with the differentiated interchangeable electronic controller 10 are not necessarily associated with the processor platform used by system network server 18.

In the demonstration, system network server 18 and interchangeable electronic controller 10 interacted with other applications associated with the database of applications 56 such as an engine controller or an ECLSS controller via server network interface 52. In both circumstances, control and telemetry data was retrieved by the specific application associated with the corresponding PFID. Control and monitor applications display telemetry on a monitor 58 and may interact with differentiated interchangeable electronic controller 10 via a keyboard and mouse interface. Although only two applications are described in the demonstration, a plurality of applications could be running with one or more processor entities. Additionally, such applications need not provide a human interface as was utilized for the demonstration.

FIG. 3 shows system 300, which is another exemplary embodiment of the present invention. A plurality of interchangeable electronic controllers 310 exist in a network interfaced to their respective subsystems 312. Any number of electronic controllers 310 and subsystems 312 might be involved in system 300. In one embodiment, instead of having a separate PFID connector to determine position and system function, PFID component 302 may be implemented as a switch in a point-to-point configuration. This point-to-point arrangement with the PFID component 302 identifies to network server 304, or possibly other network servers such as server 306, unique interchangeable electronic controllers 310 in their respective location in system 300. For example, when interchangeable electronic controllers 310 are attached and powered up, each interchangeable electronic controller 310 would transmit its respective host-type information back to network server 304. Because a specific point-to-point location is mapped into the network server 304, once a request from an interchangeable electronic controller 310 has been received, the server proceeds to send the application-specific code using an error correctable transmission protocol. In addition, a display and command station could be separately tied to the network for receiving interchangeable electronic controller 310 status, as well as sending commands to an interchangeable electronic controller 310. The display could show a plurality of active interchangeable electronic controllers 310 in the network and a person at a workstation could select the interchangeable electronic controller 310 to acquire status or send commands. Other point-to-point methods could be used depending on the network implemented. Thus, means of identifying the position of an interchangeable electronic controller 310 in a network and of the function it is to perform are not limited to the embodiments described.

Accordingly, the present invention provides the ability of one interchangeable electronic controller 10 to be used in multiple locations and applications in system 100 by enabling software to configure it based on its recognized PFID in system 100. The step of configuration is done automatically via system network server 18 that reads the information on the positional and functional identification of interchangeable electronic controller 10 and loads it with the correspondingly predetermined application-specific software necessary to perform its identified specific function in the subsystem/system.

System 100 enables a minimal number of spare controllers to be carried on-board a ship or craft or used in a plant, because one system controller can be used in multiple applications and locations. Further, costs to develop subsystems are reduced because common electronics, boxes, and cabling is used. The network server performs the step of configuring the newly attached controller to the network; thus, a crewperson or worker does not intervene other than attaching the controller to the subsystem/system and powering it up.

Because multiple controllers existing in different subsystems can be interchanged, this approach provides a means of subsystem spares when storage space is of a premium, such as on a long duration mission to a moon base or to the planet Mars or beyond. Further, the ability to swap out controllers from one subsystem to another greatly improves the availability and reliability of the subsystem as well. Other industries, such as the military or the airline industry, could benefit from the innovation when faced with a similar subsystem challenge and could realize a cost savings. For example, a jet airliner cabin air-conditioning and pressurization controller could be exchanged with the engine control and monitoring controller. Because this method allows interoperability of intelligent controllers in a system/subsystem and the method takes advantages of using open hardware, software, and communication protocol standards, substantial cost savings can occur, because only one type of controller is used throughout many subsystems.

While a few exemplary embodiments of this invention have been described in detail above, a person skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A system for controlling more than one group of subsystem components performing a particular type of function, comprising:

means for identifying the particular type of function performed by each group of subsystem components, said identifying means providing specific identifying information associated with each group of subsystem components for further communication;

a plurality of programmable means, operatively linked with said identifying means, for controlling the particular type of function performed by each group of subsystem components, each of said plurality of programmable means for controlling being interchangeably connectable in an operative manner with each group of subsystem components; and at least one means, in communication with said plurality of programmable means for controlling, for storing a plurality of software applications, each of said plurality of software applications defining a particular set of instructions necessary for operation of one of said plurality of programmable means for controlling the particular type of function performed by one of said group of subsystem components when said one programmable means for controlling is operatively connected to a respective one of said groups of subsystem components, said at least one means for storing being programmed to:
(i) select a predetermined one of said plurality of software applications based on the specific identifying information associated with said group of subsystem components that is communicated by said identifying means, and (ii) transfer each said selected software application to each said corresponding programmable means for controlling for appropriate configuration of said corresponding programmable means upon operative connection with a respective one of said groups of subsystem components.

2. The system of claim 1 wherein said identifying means comprises a plurality of subsystem component group identifier circuits that are electronically connectable with said plurality of programmable means for controlling and for communicating the specific identifying information to each said corresponding one of said plurality of programmable means for controlling once said respective programmable means for controlling and said respective subsystem component group identifier circuit are linked together.

3. The system of claim 1 wherein said identifying means comprises at least one of a switch box, a connector, a cable, and a Radio Frequency Identification (RFID) device.

4. The system of claim 1 wherein said at least one means for storing is interchangeable with at least one of said plurality of programmable means for controlling.

5. The system of claim 1 wherein each of said plurality of programmable means for controlling stores architecture information specific to each one of said plurality of programmable means for controlling and wherein said at least one means for storing is programmed to select a predetermined one of said plurality of software applications based on the combination of the specific identifying information communicated by said identifying means and the specific architecture information communicated by said programmable means for controlling.

6. The system of claim 2 wherein at least one of said plurality of programmable means for controlling comprises at least one analog signal circuit.

7. The system of claim 6 wherein said analog signal circuit comprises programmable amplifier gain capabilities.

8. The system of claim 6 wherein at least one of said plurality of programmable means for controlling further comprises at least one digital input/output circuit.

9. The system of claim 8 wherein said plurality of subsystem component group identifier circuits are electronically interconnected with said plurality of programmable means for controlling for digital communication through at least one of said at least one digital input/output circuit.

10. The system of claim 1 wherein each of said plurality of programmable means for controlling further comprises nonvolatile memory operable for storing at least one of said plurality of software applications.

11. The system of claim 1 wherein at least one of said plurality of programmable means for controlling further comprises at least one wireless transceiver.

12. A system for controlling more than one group of subsystem components, comprising:
a subsystem component group identifier for providing specific identifying information associated with each group of subsystem components for further communication;
a plurality of programmable electronic controllers, operatively linked with said subsystem component group identifier, for controlling at least one group of subsystem components, each of said plurality of programmable electronic controllers being interchangeably connectable in an operative manner with each group of subsystem components; and
at least one server, in communication with said plurality of programmable electronic controllers, for storing a plurality of software applications, each of said plurality of software applications defining a particular set of instructions necessary for operation of one of said plurality of programmable electronic controllers when said one programmable electronic controller is operatively connected to a respective one of said groups of subsystem components, said at least one server being programmed to: (i) select a predetermined one of said plurality of software applications based on the specific identifying information associated with said group of subsystem components that is communicated by said subcomponent group identifier, and (ii) transfer each said selected software application to each said corresponding programmable electronic controller for appropriate configuration of said corresponding programmable electronic controller upon operative connection with a respective one of said groups of subsystem components.

13. The system of claim 12 wherein said subcomponent group identifier comprises a plurality of subsystem component group identifier circuits that are electronically connectable with said plurality of programmable electronic controllers and are for communicating the specific identifying information to each said corresponding one of said plurality of programmable electronic controllers once said respective programmable electronic controller and said respective subcomponent group identifier circuit are linked together.

14. The system of claim 12 wherein said subsystem component group identifier comprises at least one of a switch box, a connector, a cable, and a Radio Frequency Identification (RFID) device.

15. The system of claim 12 wherein said at least one server comprises one of said plurality of programmable electronic controllers.

16. The system of claim 12 wherein each of said plurality of programmable electronic controllers stores and communicates information specific to the architecture of each one of said plurality of programmable electronic controllers and wherein said at least one server is programmed to select a predetermined one of said plurality of software applications based on the combination of the specific identifying information communicated by said subsystem component group identifier and the specific architecture information communicated by said respective programmable electronic controller.

17. The system of claim 12 wherein at least one of said plurality of programmable electronic controllers comprises at least one analog signal circuit.

18. The system of claim 17 wherein said analog signal circuit comprises programmable amplifier gain capabilities.

19. The system of claim 17 wherein at least one of said plurality of programmable electronic controllers comprises at least one digital input/output circuit.

20. The system of claim 13 wherein said plurality of subsystem component group identifier circuits are electronically interconnected with said plurality of programmable electronic controllers for digital communication.

21. The system of claim 12 wherein each of said plurality of programmable electronic controllers further comprises nonvolatile memory operable for storing at least one of said plurality of software applications.

22. The system of claim 12 wherein at least one of said plurality of programmable electronic controllers further comprises at least one wireless transceiver.

23. A system, comprising:
- a plurality of group of subsystem components, each said group of subsystem components including an architecture selected from the set comprising at least one actuator, at least one sensor, and at least one sensor and at least one actuator, each said group of subsystem components performing a particular type of function, wherein the particular type of function performed by at least one of said group of subsystem components differs in nature from the particular type of function performed by another one of said group of subsystem components;
- a subsystem component group identifier associated with the particular type of function performed by each said group of subsystem components and operatively connected thereto;
- a plurality of interchangeable, programmable electronic controllers, said plurality of interchangeable, programmable electronic controllers being operatively interconnectable with each said group of subsystem components and operatively linked with said subsystem component group identifier; and
- at least one server in communication with said plurality of interchangeable, programmable electronic controllers, said at least one server being operable for storing a plurality of software applications, each of said plurality of software applications defining a particular set of instructions necessary for operation of one of said plurality interchangeable, programmable electronic controllers in correspondence with the particular type of function performed by one of said plurality of groups of subsystem components when said respective interchangeable, programmable electronic controller is operatively interconnected to a respective one of said groups of subsystem components, said at least one server being programmed to: (i) select a predetermined one of said plurality of software applications based on said subsystem component group identifier associated with the particular type of function of said group of subsystem components and (ii) transfer each said selected software application to each said corresponding one interchangeable, programmable electronic controller for appropriate configuration of said corresponding one interchangeable, programmable electronic controller upon operative interconnection with a respective one of said groups of subsystem components.

24. The system of claim 23 wherein said subsystem component group identifier comprises a plurality of subsystem component group identifier circuits that are electronically connectable with said plurality of interchangeable, programmable electronic controllers for communicating the particular type of function of one of said plurality of groups of subsystem components to each said corresponding one of said plurality of interchangeable, programmable electronic controllers when each said respective one interchangeable, programmable electronic controller is operatively linked to a respective one of said plurality of groups of subsystem components.

25. The system of claim 23 wherein said subsystem component group identifier comprises at least one of a switch box, a connector, a cable, and a Radio Frequency Identification (RFID) device.

26. The system of claim 23 wherein said at least one server comprises one of said plurality of interchangeable, programmable electronic controllers.

27. The system of claim 23 wherein each of said plurality of interchangeable, programmable electronic controllers stores information specific to the architecture of each of said plurality of programmable electronic controllers and wherein said at least one server is programmed to select a predetermined one of said plurality of software applications based on the combination of said subsystem component group identifier associated with the particular type of function performed by one of said plurality of groups of subsystem components and said information specific to the architecture of one of said plurality of programmable electronic controllers.

28. The system of claim 23 wherein at least one of said plurality of interchangeable, programmable electronic controllers comprises an analog signal circuit.

29. The system of claim 28 wherein said analog signal circuit comprises programmable amplifier gain capabilities.

30. The system of claim 24 wherein at least one of said plurality of interchangeable, programmable electronic controllers comprises a digital input/output circuit.

31. The system of claim 30 wherein said plurality of subsystem component group identifier circuits are electronically interconnectable with said plurality of interchangeable, programmable electronic controllers for digital communication through said at least one digital input/output circuits.

32. The system of claim 23 wherein each of said plurality of interchangeable, programmable electronic controllers further comprises non-volatile memory operable for storing at least one of said plurality of software applications.

33. The system of claim 23 wherein at least one of said plurality of interchangeable, programmable electronic controllers further comprises at least one wireless transceiver.

34. A method for controlling a system comprising more than one group of subsystem components, each group performing a particular type of function, comprising the steps of:
- operatively connecting at least one reconfigurable, interchangeable electronic controller to one of said group of subsystem components;
- identifying the particular type of function performed by each operatively connected group of subsystem components, said step of identifying providing specific identifying information associated with each group of subsystem components;
- storing a plurality of software applications, each of said plurality of software applications defining a specific set of instructions for said reconfigurable, interchangeable controller that correspond to the specific identifying information associated with each one of said group of subsystem components;
- selecting a predetermined one of said plurality of software applications based on the specific identifying information associated with each one of said group of subsystem components and communicated by said reconfigurable, interchangeable controller; and
- transferring each said selected software application to each said corresponding reconfigurable, interchangeable electronic controller for configuration of said corresponding reconfigurable, interchangeable electronic controller, whereby control and operation of said operatively connected group of subsystem components is enabled.

35. The method of claim 34 further comprising the step of storing architecture information specific to each one of said reconfigurable, interchangeable electronic controllers, wherein said step of selecting a predetermined one of said plurality of software applications is based on the combination of the specific identifying information and the specific architecture information communicated by said reconfigurable, interchangeable electronic controller.

36. The method of claim 34 further comprising the step of:
identifying the particular position of each operatively connected group of subsystem components, said step of identifying the particular position also being part of said specific identifying information associated with each group of subsystem components; wherein said step of selecting a predetermined one of said plurality of software applications is based on the combination of the specific identifying information related to the particular function and the particular position of each group of subsystem components.

* * * * *